United States Patent [19]  
Bolton et al.

[11] Patent Number: 4,668,574  
[45] Date of Patent: May 26, 1987

[54] LAMINATED SAFETY GLASS

[75] Inventors: Nelson P. Bolton, Quakertown; W. Novis Smith, Jr., Philadelphia, both of Pa.

[73] Assignee: Advanced Glass Systems, Corp., Trumbauersville, Pa.

[21] Appl. No.: 852,377

[22] Filed: Apr. 16, 1986

Related U.S. Application Data

[63] Continuation of Ser. No. 693,860, Jan. 1, 1985, abandoned, which is a continuation-in-part of Ser. No. 490,997, May 3, 1983, abandoned.

[51] Int. Cl.⁴ ............................................. B32B 17/10
[52] U.S. Cl. .................................. 428/339; 428/411.1; 428/412; 428/429; 428/441; 428/442
[58] Field of Search ............... 428/442, 441, 411.1, 428/414, 429, 334, 339; 156/106, 99, 306.6, 331.6, 334

[56] References Cited

U.S. PATENT DOCUMENTS

| | | | |
|---|---|---|---|
| 3,328,367 | 6/1967 | Rees | 260/85.5 |
| 3,344,014 | 8/1967 | Rees | 428/441 |
| 3,404,134 | 10/1968 | Rees | 260/78.5 |
| 3,471,460 | 10/1969 | Rees | 260/88.1 |
| 3,582,455 | 6/1971 | DeLap | 428/442 |
| 3,666,614 | 5/1972 | Snedeker | 428/442 |
| 3,959,539 | 5/1976 | Waggoner | 428/441 |
| 3,998,990 | 12/1976 | Iwami | 428/442 |
| 4,125,669 | 11/1978 | Triebel | 428/442 |
| 4,201,828 | 5/1980 | Triebel | 428/442 |
| 4,204,029 | 5/1980 | Batchelor | 428/442 |
| 4,312,903 | 1/1982 | Molari | 428/442 |
| 4,328,277 | 5/1982 | Molari | 428/412 |
| 4,410,595 | 10/1983 | Matsumoto | 428/412 |

Primary Examiner—Ellis P. Robinson  
Attorney, Agent, or Firm—Steele, Gould & Fried

[57] ABSTRACT

Laminated articles, particularly safety glass, are disclosed which comprise a lamina of ionomer film laminated to a sheet of glass. The ionomer resin film is preferably an ionically cross-linked resin prepared from ethylene or an alpha-olefin and carboxylic acid monomers. In particular, ethylene and acrylic acid monomers are preferred but other monomers are also disclosed. The laminated articles may also comprise a sheet of polycarbonate laminated to the ionomer resin film opposite the glass. The laminated articles may further comprise an ionomer resin film sandwiched between two sheets of glass. The laminated articles may still further comprise a sheet of polycarbonate or other plastic material or metal sandwiched between sheets of ionomer resin film, which are in turn sandwiched between sheets of glass.

21 Claims, 9 Drawing Figures

LAMINATED SAFETY GLASS

RELATED APPLICATION

This application is a continuation of Ser. No. 693,860 filed Jan. 1, 1985, now abandoned which is a continuation-in-part of our co-pending application Ser. No. 490,997, filed May 3, 1983, now abandoned and entitled: "Laminated Safety Glass".

BACKGROUND OF THE INVENTION

1. Field of the Invention

This invention relates to the field of reinforced glass structures in general, and in particular, to laminated safety glass reinforced with ionomer resin films and/or polycarbonates. Laminates of glass, ionomer resin, and metal are also contemplated in the invention.

2. Description of Prior Art

Safety glass can be reinforced by lamination with an inner layer of polycarbonate. The resulting lamination, however, is impractical for two principal reasons. One reason is insufficient bond strength when the polycarbonate is bonded directly to the glass. A second, and even more important reason stems from polycarbonate and glass having different co-efficients of thermal expansion. Safety glass laminates made by bonding polycarbonate directly to glass will delaminate on cooling from the temperature necessary to bond glass and polycarbonate, due to the different thermal expansion co-efficients of the components.

Initial attempts to solve these problems involved interposing additional interlayers of polyvinyl butyral (PVB) between the polycarbonate and the glass. A plasticizer was necessary, and the plasticizer used in the PVB often caused the polycarbonate to develop stress cracks and haze, and accordingly, to have low light transmission properties.

The initial problems appear to have been solved in the laminated safety glass described in U.S. Pat. No. 3,888,032, which has achieved wide commercial success. The laminate comprises polycarbonate reinforced glass wherein the polycarbonate and glass are bonded to one another by an interlayer of aliphatic polyurethane. Polyurethane provides sufficient adhesion to the glass and to the polycarbonate, and no stress cracking or cloudiness developes in the product.

Despite the commercial success of the transparent aliphatic polyurethane laminated product, there has been a continuing effort to develop less expensive products, particularly since aliphatic polyurethane is an expensive component. This invention provides new glass laminates, with and without layers of polycarbonates, and other reinforcing transparent plastics, which are considerably less expensive than the aliphatice polyurethane laminates, and which at the same time are every bit as satisfactory, if not more so, with regard to adhesion, strength and clarity. Laminates according to this invention comprise at least one layer of glass laminated directly to an ionomer resin film.

In the specification and claims the terms "ionomer" or "ionomer resin" mean an extrudable resin comprising ionically cross-linked ethylene or alpha olefin-carboxylic acid copolymers and mixtures thereof. Of interest are the ionically cross-linked copolymers prepared from a combination of ethylene, styrene or propylene monomers and acrylic acid, methacrylic acid and maleic anhydride monomers. Furthermore of particular significance are the sodium or zinc cross-linked ethylene or alpha olefin-carboxylic acid copolymers, i.e. methacrylic or acrylic acid, copolymers. Properties which distinguish ionomer resins from other polyolefin heat-seal polymers are their high clarity, melt strength, solid-state toughness and resistance to oil/fat permeation. Ionomer resins are generally commercially available as either a sodium or a zinc ionomer, and are available in a wide variety of grades. Amine salts of the copolymers are also included, as are the acid form, partially neutralized acid form, and metal salts of the acid copolymers. Although all grades of ionomer resins generally exhibit the properties noted above when compared to other thermoplastic polymers, sodium ionomers are known for exceptional toughness and resistance to fats and oils, while zinc ionomers exhibit outstanding adhesion to unprimed foil and possess excellent chemical resistance. Sodium ionomers have proved to provide the best clarity, the zinc ionomers proving to be hazy at times. The metal ion free or unneutralized version such as Nucrel ® or Primcor ® are generally clear but having lower strength.

Various grades of ionomer resins are available for extrusion coating and film extrusion. It is also known that ionomer resins can be laminated with other plastic resins and exhibit adhesion to other polyolefins, nylon resins and coextrudable adhesive resins often used as bonding layers in multi-ply coextruded or laminated structures. A very wide variety of ionomer resins are manufactured by E.I. DuPont de Nemours and Company under the registered trademark "SURLYN". Other ionomer resins are those manufactured by Du-Pont under the name NUCREL (ethylene-methacrylic acid copolymer) and PRIMACOR (ethylene-acrylic acid copolymer) manufactured by DOW Chemical Company.

Ionomer resins have been suggested for use primarily in the area of packaging, for foods, liquids and pharmaceuticals, as well as certain industrial applications including lightweight sails, bonded cable sheath, roof underlayment and flame retardant products. In most applications, ionomer resins are offered as a superior substitute for polyethylene. In none of the literature or prior art, other than our copending application Ser. No. 490,997, filed May, 8, 1983, is there any suggestion that ionomer resins should or could be used for reinforcing glass layers or for bonding layers of glass to polycarbonate or other plastic layers, in order to form a laminated safety glass. Moreover, there is no suggestion in the literature or prior art to indicate that ionomer resins could or should be substituted generally for polyurethanes or polycarbonates.

Layers of ionomer resins can be formed by casting or extrusion, the latter being preferred. When the ionomer resin layers are sufficiently thick, polycarbonate layers can be eliminated altogether while still maintaining sufficiently acceptable degrees of light transmission, impact resistance and strength.

Ionomer resins have several advantages over polyurethane. Polyurethane is more difficult to manufacture and maintain consistent high quality, and aliphatic, for example, is frequently not clear or gel-free enough for use in windshields and the like. By contrast, ionomer resin films can be easily extruded to desired thicknesses, and at about one-half the material cost of polyurethane. Ionomer resins have demonstrated better adhesion characteristics in comparison to polycarbonates, as well as better resistance to lower temperatures and solvents.

In preferred embodiments, the sufrace to which the ionomer resin is adhered may be primed to improve adhesion, as is the case with polyurethane. Silane coupling agents are suitable primers. With regard to optical properties, ionomer resins demonstrate better clarity than polyurethanes. Moreover, the ionomer resins are more hydrolytically stable to water, acids and bases, and overall, are less likely to weaken with time. This greatly enhances the useful life of laminates made in accord with the present invention.

SUMMARY OF THE INVENTION

It is an object of this invention to provide a laminated article based on laminates of glass and ionomer resins, and depending upon application, laminates of glass, ionomer resin and polycarbonate or other transparent plastics as well. The laminated articles have all of the advantages and positive features of laminates of glass and polyurethane, but are significantly less expensive to produce and have other enhanced features such as increased clarity solvent resistance and greater useful life.

It is another object of this invention to provide a laminated article of glass, ionomer resin and polycarbonate which has good adhesion and which is transparent and resistant to breakage for applications such as the anti-lacerative windshield, security glass, and transportation windshields.

It is still another object of this invention to provide a laminated article of glass, ionomer resin and polycarbonate which has good strength properties over a wide temperature range.

These and other objects of this invention are accomplished by articles comprising a lamina of ionomer resin film laminated to a sheet of glass. The ionomer resin film is preferably an ionically crosslinked ethylene-methacrylic acid or ethylene-acrylic acid copolymer; however, other ionomer resin copolymers will also be discussed. The laminated articles may also comprise a sheet of polycarbonate laminated to the ionomer resin film opposite the glass, and the laminated articles may further comprise an ionomer resin film sandwiched between two sheets of glass. The laminated articles may still further comprise a sheet of polycarbonate sandwiched between sheets of ionomer resin film, which are in turn sandwiched between sheets of glass. The laminated articles may still further comprise an ionomer resin film sandwiched between a sheet of glass and a sheet of acrylic plastic and an ionomer resin film sandwiched between a sheet of glass and a sheet of metal or ceramic. The laminated articles may also comprise any number of laminae of glass sandwiched with a lamina of ionomer resin, the resultant laminate having glass as the outer lamina.

BRIEF DESCRIPTION OF THE DRAWING

The figure illustrate cross-section views through portions of laminated articles made in accordance with this invention, wherein.

DETAILED DESCRIPTION OF THE PREFERRED EMBODIMENTS

Figure 1:
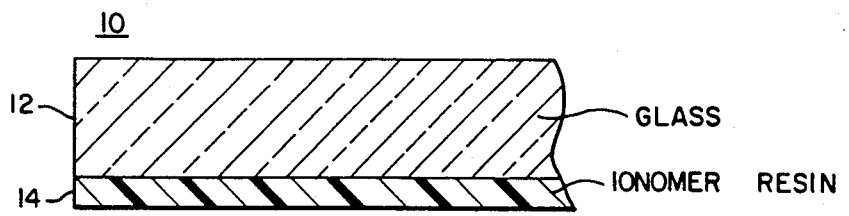
FIG. 1 is a glass/ionomer resin laminate.

The basic laminated safety glass article according to this invention is shown in FIG. 1. The laminate 10 comprises a sheet of glass 12 laminated to an ionomer resin layer 14. The ionomer resin layer 14 is thicker in the basic laminated article than in articles including a layer of polycarbonate or a second layer of glass.

Figure 2:
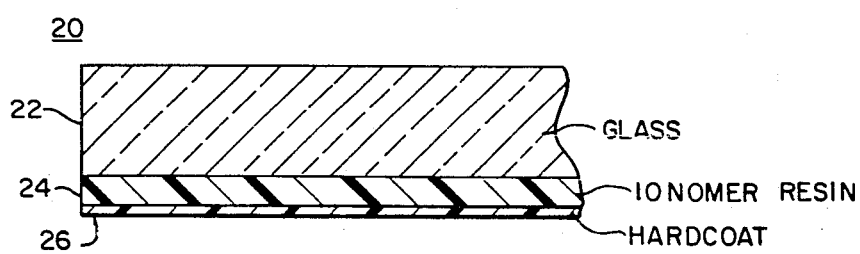
FIG. 2 is a glass/ionomer resin laminate having a hard coat on the otherwise exposed surface of the ionomer resin layer.

A second embodiment of a laminated safety glass article according to this invention is shown in FIG. 2. The laminate 20 comprises a sheet of glass 22 and an ionomer resin layer 24, similar to the laminate 10 of FIG. 1. However, the embodiment of FIG. 2 is further provided with a hard coat 26 on the otherwise exposed surface of the ionomer resin film, in order to protect the ionomer resin film form scratching, abrasion and other similar damage. A "hard coat" provides abrasion resistant, optically transparent coatings which serve to protect the surface and render the laminate more resistant to scratching and the like. Useful "hard coat" compositions are described in U.S. Pat. No. 4,027,073 and U.S. patent application Ser. No. 473,790, filed Mar. 10, 1983, and assigned to the owner of this application.

Figure 3:
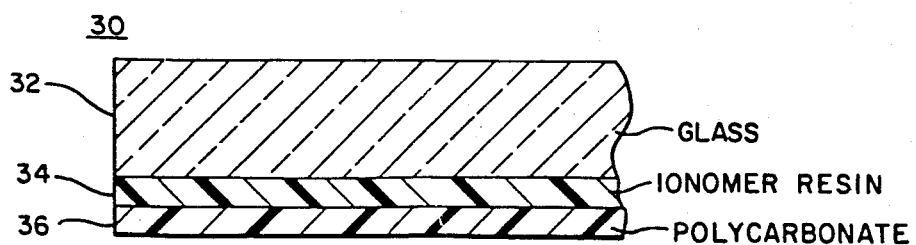
FIG. 3 is a glass/ionomer resin/polycarbonate laminate.

A third embodiment of a laminated safety glass article according to this invention is shown in FIG. 3. The laminate 30 comprises a sheet of glass 32 laminated to an ionomer resin film 34, which is in turn laminated to a polycarbonate layer 36. As additional strength is provided by the polycarbonate layer 36, the ionomer resin layer 34 may be thinner than the ionomer resin layer 14 in the embodiment shown in FIG. 1.

Figure 4:
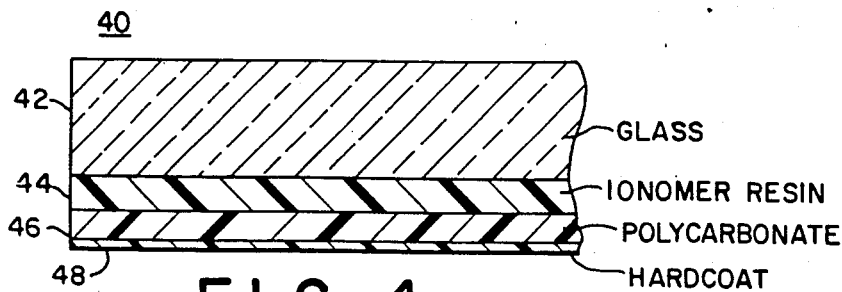
FIG. 4 is a glass/ionomer resin/polycarbonate laminate having a hard coat on the otherwise exposed surface of the polycarbonate layer.

A fourth embodiment of a laminated safety glass article according to this invention is shown in FIG. 4. The laminate 40 is similar to that of FIG. 3, in comprising a glass sheet 42, an ionomer resin layer 44 and a polycarbonate layer 46. Although polycarbonate is used to provide additional strength to the laminate, polycarbonates are usually too soft, and therefore subject to scratches and abrasion. Accordingly, the laminate 40 is provided with a hard coat layer 48 for protecting the otherwise exposed surface of the polycarbonate layer 46.

Figure 5:
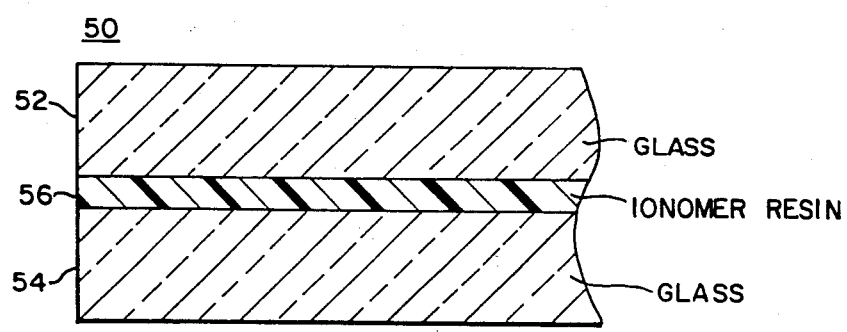
FIG. 5 is a glass/ionomer resin/glass laminate.

A fifth embodiment of a laminated safety glass article according to this invention is shown in FIG. 5. The laminate 50 comprises two sheets of glass 52, 54 joined by an ionomer resin layer 56. As no soft surfaces are exposed, no hard coat layer is necessary.

Figure 6:
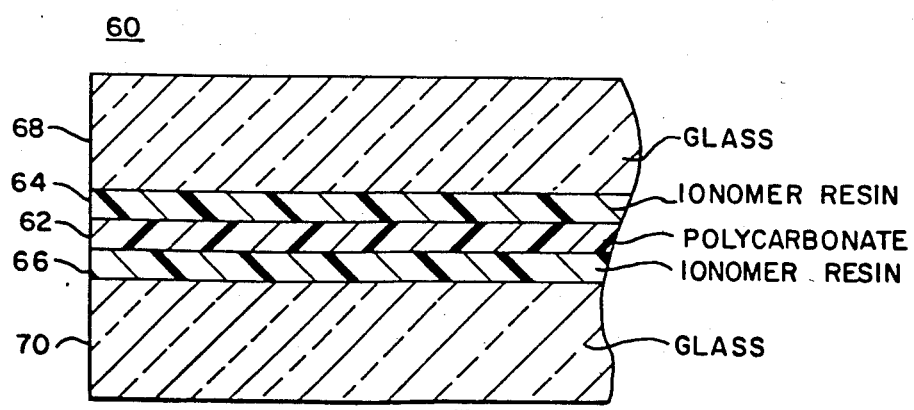
FIG. 6 is a glass/ionomer resin/polycarbonate/ionomer resin/glass laminate.

A sixth embodiment of a laminated safety glass article according to this invention is shown in FIG. 6. The laminate 60 comprises first a polycarbonate layer 62 sandwiched between two ionomer resin layers 64, 66. The ionomer resin/polycarbonate/ionomer resin laminate is itself sandwiched between two glass sheets 68 and 70. As might be expected, the thicker and more complex laminate 60 shown in FIG. 6 is more expensive to produce than the laminates shown in FIGS. 1–5, but it exhibits the greatest strength and resistance to shattering and spalling.

Figure 7:
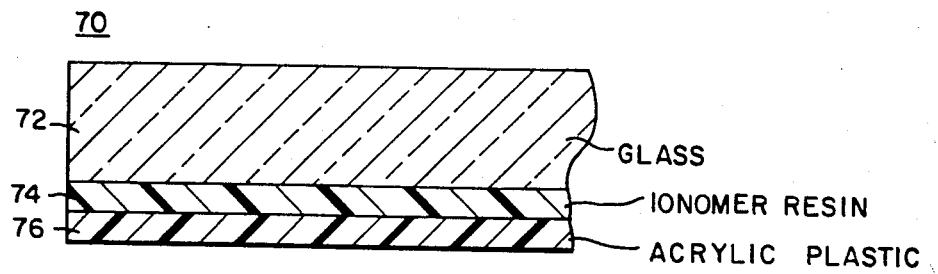
FIG. 7 is a glass/ionomer resin/acrylic plastic laminate.

A seventh embodiment of a laminated safety glass article according to this invention is shown in FIG. 7. The laminate 70 comprises a sheet of glass 72 and a sheet of acrylic plastic 76 joined by an ionomer resin film layer 74. The acrylic plastic layer 76 may or may not be coated with an appropriate hard coat.

Figure 8:
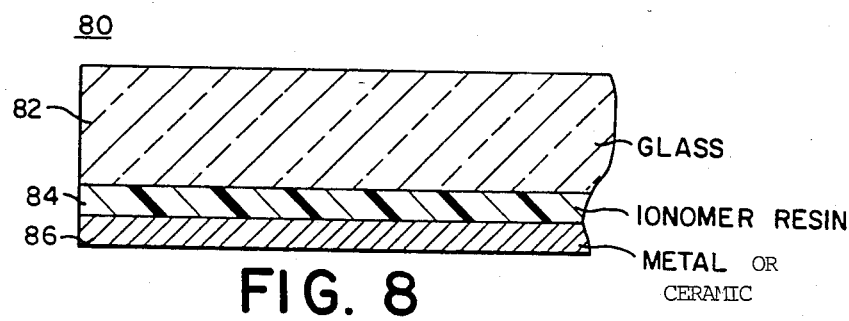
FIG. 8 is a glass/ionomer resin/metal laminate or ceramic.

An eighth embodiment of a laminated safety glass article according to this invention is shown in FIG. 8. The laminated article 80 comprises a sheet of glass 82 and a sheet of metal or ceramic 86 joined by an ionomer resin film layer 84. When the layer 86 is metal, it may be any metal, but aluminum, silver, iron and copper are preferred.

Figure 9:
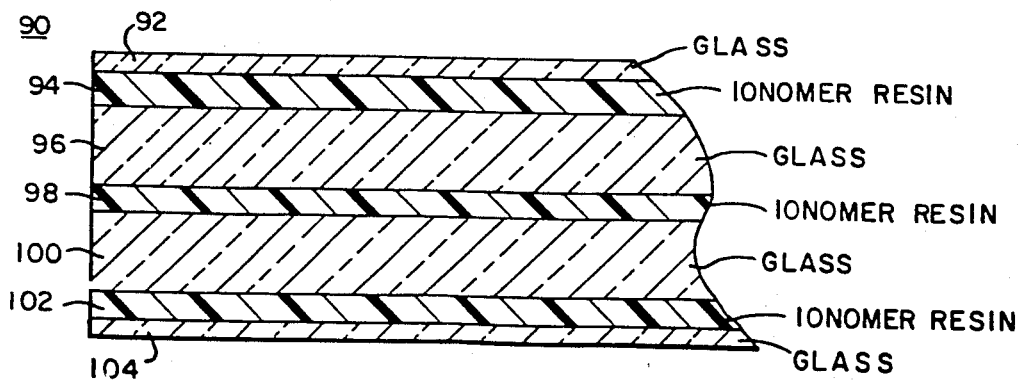
FIG. 9 is a glass/ionomer resin/glass/ionomer resin/glass/ionomer resin/glass laminate.

A ninth embodiment of a laminated safety glass article according to this invention is shown in FIG. 9. The laminated article 90 comprises sheets of glass 92, 96, 100 and 104 sandwiched by ionomer resin film layers 94, 98 and 102.

A number of transparent laminates were prepared for a first series of tests, using a 2.5 millimeter thick sheet of float glass, a ⅛ inch sheet of polycarbonate and a 30 mil thick layer of an ionomer resin film. The ionomer resin film incorporated in the laminate is formulated by melting the ionomer resin pellets, preferably under an inert atmosphere, such as may be provided by nitrogen, at about 380° F., and extruding the molten resin through a die in accordance with procedures well known in the art. Films and sheets varying in thickness from 1 mil to 200 mils may be used in the laminates of the invention. The ionomer resin film may be rolled and stored, preferably in a bag or other container to protect it from dust, dirt or other contaminates. The ionomer resin pellets may also be melted and poured into a mold to produce cast sheets of ionomer resin for use in preparing the desired laminates.

The sheets and layers were approximately 4 inches by 5 inches in size to facilitate handling and processing. In particular, the ionomer resin film was "SURLYN" 1601, manufactured by the Polymer Products Department of the DuPont Company. The melt index of "SURLYN" 1601 is 1.3 dg/min, ASTM D-1238. The ion type is sodium and the density is 0.94 g/cc. A data information sheet on "SURLYN" 1601 ionomer resin (for flexible packaging) is available under the number E-29173 (7/81). The information of this technical release, including the rheology curves, is incorporated herein by reference. SURLYN type 1707 is also a preferred sodium ionomer resin for use in this invention.

Organic polyamines may be combined with the ionomer resin in an amount of from about 0.5 to about 20% by weight, based on the weight of the resin. It has been found that the presence of an organic amine in the ionomer resin may serve to maintain the optical clarity of the laminates produced in the invention. Useful organic amines include aliphatic diamines or triamines or related compounds such as triethylene tetramine or diethylenetriamine. The commercially available organic amines are simply combined with the ionomer resin pellets and extruded or cast as desired.

Likewise, a mixture of sodium and zinc ionomer resins may be used to prepare the ionomer resin film useful in the invention. The sodium and zinc ionomer resins may be combined in a ratio of 95:5 to 5:95. In addition, the sodium and zinc ionomers can also be combined with polyamines to form additional resins.

For purposes of simplifying the test, the sandwich was constructed with one outer layer of glass, one inner layer of ionomer resin and one outer layer of polycarbonate. A three layer laminate as tested can be fully expected to perform in the same manner as a five layer lamination such as that shown in the drawing with regard to adhesion, if not overall strength at comparable thicknesses. The sandwiched laminates were assembled in a vacuum bag and placed in an autoclave. The samples were heated to a temperature of from about 200° F. to about 310° F. over a 45 minute period, were held at the elevated temperature for about 15 minutes, and were then cooled to room temperature, approximately 65° F.–70° F. After cooling, the laminates were immersed in boiling water in an effort to promote premature and unwanted delamination. Throughout all of the examples herein, the same basic procedure, involving vacuum bag, autoclave, heating up, sustained heating and cooling were followed unless otherwise noted. The preferred range of temperatures in the autoclave is from about 180° F. to 310° F.

The tests were conducted with and without certain primers to promote adhesion between the ionomer resin and the glass and polycarbonate respectively. Primers suitable for glass, and the glass/ionomer resin interface in particular, were found to include silanes, such as those produced under the registered trademarks "Z-6040" and "Z-6020" by Dow Chemical Company. Other primers suitable for the polycarbonate/ionomer resin interface in particular, were found to include organic amines, usually in a diluted solution with an inert solvent (unlikely to attack the polycarbonate, e.g. alkanes and alcohols), such as aliphatic or polyethylene amines, and specifically diethylenetriamine. Other specific primers include diisocyanates (toluene diisocyanate) and polyacrylic acid (produced under the registered trademark "ACRYSOL" by the Rohm and Haas Company). These primers are distinguished from adhesives which have previously been used to adhere different layers to each other. In this invention, a primer is applied to the surface in order to chemically modify the surface so that better bonding between surfaces is achieved. The chosen primer is generally applied extremely thin, perhaps only a molecule thick, and is not tacky nor does it provide adhering qualities of its own. The essential purpose of the primer is simply to improve the bond which is to be formed between the two surfaces. An adhesive, on the other hand, would be a distinct layer in the laminate. An adhesive would actually form a bond between surfaces, and the surfaces would not be bonded directly to one another. The surfaces would be bonded together through the adhesive interlayer. The use of a primer in this invention does not create a bond in and of itself, it simply improves the surface characteristics so that bonding or laminating of the layers directly to each other can be more easily achieved.

EXAMPLE 1

A laminate of glass and ionomer, the glass surface to be laminated to the ionomer resin having been primed with Dow Z-6020 was formed following the procedure set forth above. The laminate did not undergo delamination in boiling water.

EXAMPLE 2

A 30 cm by 30 cm laminate comprising a 3 mm thick clear polycarbonate sheet sandwiched between two 0.7 mm thick ionomer resin films made from SURLYN 1601 which in turn are sandwiched between 2.5 mm thick sheets of chemically strengthened glass was prepared following the procedure set forth above. The glass and polycarbonate components were throughly cleaned and treated with a silane primer to enhance adhesion. The components were dried, and free of residual solvents and moisture prior to forming the sandwich. The sandwiched laminate was bagged and autoclaved at a temperature of 205° to 255° F. under 10 atmospheres of pressure for a period of about 90 minutes. The laminate was cooled quickly to room temperature. The laminate was used as a target and a 45 calibre bullet from a handgun was fired at the laminate three times. No delamination occurred although the glass shattered. The ionomer resin film remained laminated to the polycarbonate and glass surfaces.

EXAMPLE 3

Laminates 75 mm square were prepared following the procedure and using like components specified in Example 2 were prepared. The resultant laminates were placed in boiling water. The laminates did not lose integrity after two hours in boiling water. Small bubbles did develop about the perimeter the laminates; however, visibility was only marginally impaired around the perimeter.

On the basis of the foregoing examples, ionomer resin films may be substituted for polyurethane and polyvinyl butyral in laminated safety glass, at a substantial savings in cost. The best primer for the polycarbonate/ionomer resin interface is Dow Z-6020. Other primers could prove satisfactory.

EXAMPLE 4

A 30 cm by 30 cm laminate comprising an 0.25 mm thick ionomer resin film sandwiched between 1 mm thick chemically strengthened glass and a 1 mm thick aluminized steel sheet following the procedure set forth in Example 2. The laminate was cycled between −20° F. to 160° F., 10 times and did not undergo delamination.

EXAMPLE 5

A 30 cm by 30 cm laminate comprising a 3 mm thick clean acrylic sheet sandwiched between two 1.4 mm thick ionomer resin films made from SURLYN 1707 which in turn are sandwiched between 3 mm thick sheets of chemically strengthened glass was prepared following the procedure of Example 2. A long 22 caliber rifle bullet was fired at the resulting laminate from a distance of 35 feet, and no penetration resulted.

EXAMPLE 6

A 30 cm by 30 cm laminate comprising chemically strengthened glass and ionomer resin film made from SURLYN 1707 sandwiched in the order shown in FIG. 9 was prepared following the procedure of Example 2. The lamina was laid up in the following order, starting with the target side: a 2.5 mm thick lamina of chemically strengthened glass, a 5 mm thick lamina of ionomer resin film, or 12 mm thick lamina of chemically strengthened glass, a 5 mm thick lamina of ionomer resin film, a 12 mm thick lamina of chemically strengthened glass, a 5 mm thick lamina of ionomer resin film and a 1 mm thick lamina of chemically strengthened glass. All surfaces were cleaned and treated with a silane primer to enhance adhesion. In this instance, the laminate was autoclaved under vacuum at a temperature between 205° F. and 285° F. at 10 atmosphere pressure for a 2.5 hours. After cooling quickly, the resulting laminate was clear and used as a target with the mass of glass facing in the direction of fire. A .357 magnum handgun using 158 grain metal painted ammunition of Remington was fired at the laminate. No penetration occurred after three shots were fired in a triangular pattern. The 1 mm thick glass sheet did splinter but remained laminated.

This example was repeated substituting 6 mm thick cast sheets of ionomer resin for the 5 mm thick ionomer resin lamina and in place of the 1 mm thick glass spall sheet. The resultant laminate was not penetrated when fired on as above, and only a slight bulge appeared on the spall sheet.

It is to be understood that the foregoing examples are given for the purpose of illustration and that any other suitable glass, ionomer resin, reinforcing plastic or the like could be used provided that the teachings of this disclosure are followed.

The basic building block of this invention, namely a laminate comprising a sheet of glass laminated to an ionomer resin film, may be used in multiples to achieve nearly any desired strength. This is illustrated in FIG. 9, wherein lamina of varying thickness of glass are sandwiched with lamina of varying thickness of ionomer resin film. By varying the number and the thickness of the lamina of glass and ionomer resin film, always, however, laminating in the alternative order shown in the figure, it is possible to produce laminates having resistance to exceptionally large force. The principles of this invention may also be applied to curved laminated articles, such as windshields and face masks. The laminates shown in FIGS. 1-9 are flat merely for purposes of facilitating illustration. Where transparency is not critical, the bonding techniques taught herein may be used for laminating metal and ceramic as well as glass such as illustrated in FIG. 8.

This invention may be embodied in other specific forms without departing from the spirit or essential attributes thereof, and accordingly, reference should be made to the appended claims, rather than to the foregoing specification, as indicating the scope of the invention.

Having thus described the invention,
What is claimed is:
1. A transparent laminated article free of an adhesive composition comprising:
   a lamina consisting essentially of an extruded ionomer resin film, said ionomer resin film being water insoluble and selected from the group of ionomer resins which are ionically cross-linked copolymers prepared from ethylene or an alpha-olefin and carboxylic acid monomers;
   one sheet of primed or unprimed glass laminated directly onto one surface of said lamina, and a second sheet laminated directly onto said lamina on the surface thereof opposite said sheet of glass, whereby said lamina is bonded between said sheet of glass and said second sheet without an intermediate adhesive layer, said second sheet being selected from the group of plastic materials consisting of polycarbonate and acrylic.

2. A laminated article as claimed in claim 1 wherein the surfaces laminated to said ionomer resin films are primed with a silane coupling agent.

3. A laminated article as claimed in claim 1, wherein said alpha-olefin is selected from the group consisting of proplyene and styrene.

4. A laminated article as claimed in claim 1, wherein said carboxylic acid monomers are selected from the group consisting of acrylic acid, and maleic anhydride.

5. A laminated article as claimed in claim 1, wherein said ionomer resin is the acid form of ethylene-acrylic acid copolymer.

6. A laminated article as claimed in claim 1, wherein said first lamina is prepared from ethylene and acrylic acid monomers.

7. A laminated article as claimed in claim 1, wherein said first lamina is prepared from ethylene and maleic anhydride monomers.

8. A laminated article as claimed in claim 1, wherein said ionomer resin is the partially neutralized acid form of an ethylene-acrylic acid copolymer.

9. A laminated article as claimed in claim 1, wherein said ionomer resin is a metal salt of an ethylene-acrylic acid polymer.

10. A lamina as claimed in claim 9, wherein said ionomer resin is a sodium salt of an ethylene-acrylic acid copolymer.

11. A laminated article as claimed in claim 9, wherein said ionomer resin is a zinc salt of an ethylene-acrylic acid copolymer.

12. A laminated article as claimed in claim 1, wherein said ionomer resin is a mixture of metal salts of an ethylene-acrylic acid copolymer.

13. A laminated article as claimed in claim 1, wherein said ionomer resin film is selected from the amine salts of an ethylene-acrylic acid copolymer.

14. A laminated article as claimed in claim 1, wherein said first lamina has a thickness of 20 to 2000 mils.

15. A transparent laminated article free of an adhesive composition comprising:
- a first lamina consisting essentially of an extruded ionomer resin film, said ionomer resin film being water insoluble and a mixture of the sodium and zinc salts of an ionomer resin prepared from ethylene or an alpha-olefin and carboxylic acid monomers;
- a first sheet of glass laminated directly onto one surface of said lamina, and
- a second sheet of polycarbonate resin laminated directly onto said lamina on the surface thereof opposite said glass sheet, whereby said lamina is bonded between said glass sheet and said polycarbonate sheet and adhering thereto free of adhesive compositions.

16. The laminated article of claim 15 wherein said lamina is prepared from ethylene and acrylic acid monomers.

17. The laminated article of claim 15 wherein said glass sheet and said polycarbonate sheet are primed with a silane coupling agent.

18. A transparent laminated article free of adhesive composition comprising:
- a first lamina consisting essentially of an extruded ionomer resin film, said ionomer resin film being water insoluble and the sodium or zinc salts of an ionomer resin prepared from ethylene or an alpha-olefin and carboxylic acid monomers;
- a first sheet of glass laminated directly onto one surface of said lamina, and
- a second sheet of polycarbonate resin laminated directly onto said lamina on the surface thereof opposite said glass sheet, whereby said lamina is bonded between said glass sheet and said polycarbonate sheet and adhering thereto free of adhesives.

19. The laminated article of claim 18 wherein said lamina is prepared from ethylene and acrylic acid monomers.

20. The laminated article of claim 18 wherein said glass sheet and said polycarbonate sheet are primed with a silane coupling agent.

21. A transparent laminated article free of an adhesive composition comprising:
- a lamina consisting essentially of an extruded ionomer resin film, said ionomer film being water insoluble and selected from the group of ionomer resins which are ionically cross-linked copolymers prepared from ethylene or an alpha-olefin and carboxylic acid monomers;
- one sheet of primed or unprimed glass laminated directly onto one surface of said lamina, and a second sheet laminated directly onto said lamina on the surface thereof opposite said sheet of glass, whereby said lamina is bonded between said sheet of glass and said second sheet without an intermediate adhesive layer, said second sheet being plastic material.

* * * * *